JEREMIAH MATTHEWS.
Improvement in Corn Planters.

No. 121,116.  Patented Nov. 21, 1871.

Witnesses:
E. Wolff.
Francis McArdle.

Inventor:
Jeremiah Matthews
per Munn & Co.
Attorneys.

121,116

UNITED STATES PATENT OFFICE.

JEREMIAH MATTHEWS, OF LINCOLN, ILLINOIS.

IMPROVEMENT IN CORN-PLANTERS.

Specification forming part of Letters Patent No. 121,116, dated November 21, 1871.

*To all whom it may concern:*

Be it known that I, JEREMIAH MATTHEWS, of Lincoln, in the county of Logan and State of Illinois, have invented a new and useful Improvement in Seed-Planter; and I do hereby declare that the following is a full, clear, and exact description thereof, which will enable others skilled in the art to make and use the same, reference being had to the accompanying drawing forming part of this specification.

Figure 1:
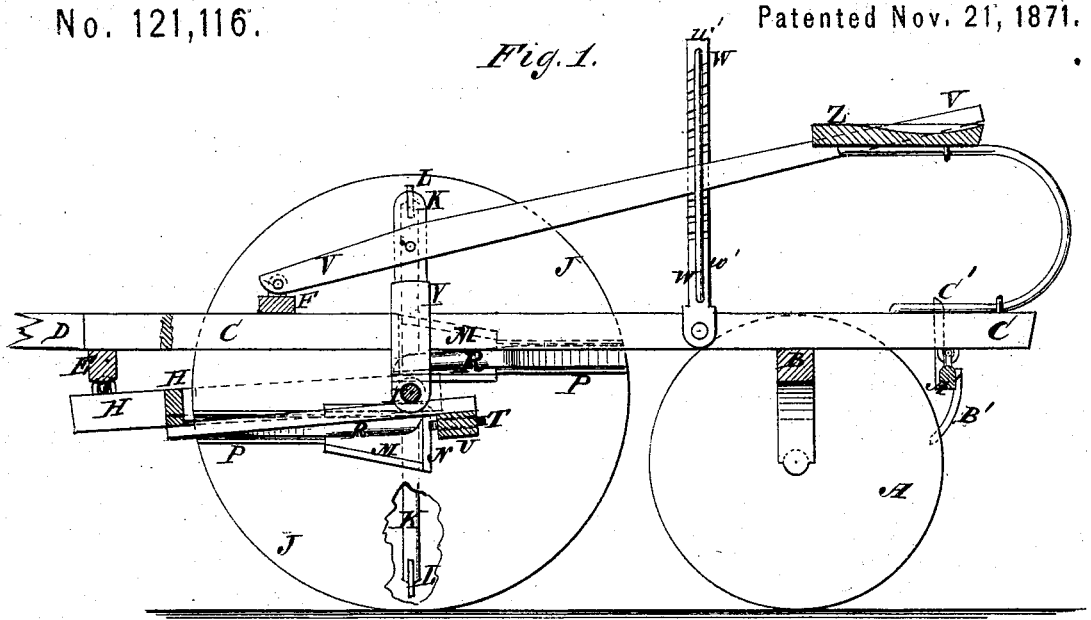
Figure 2:
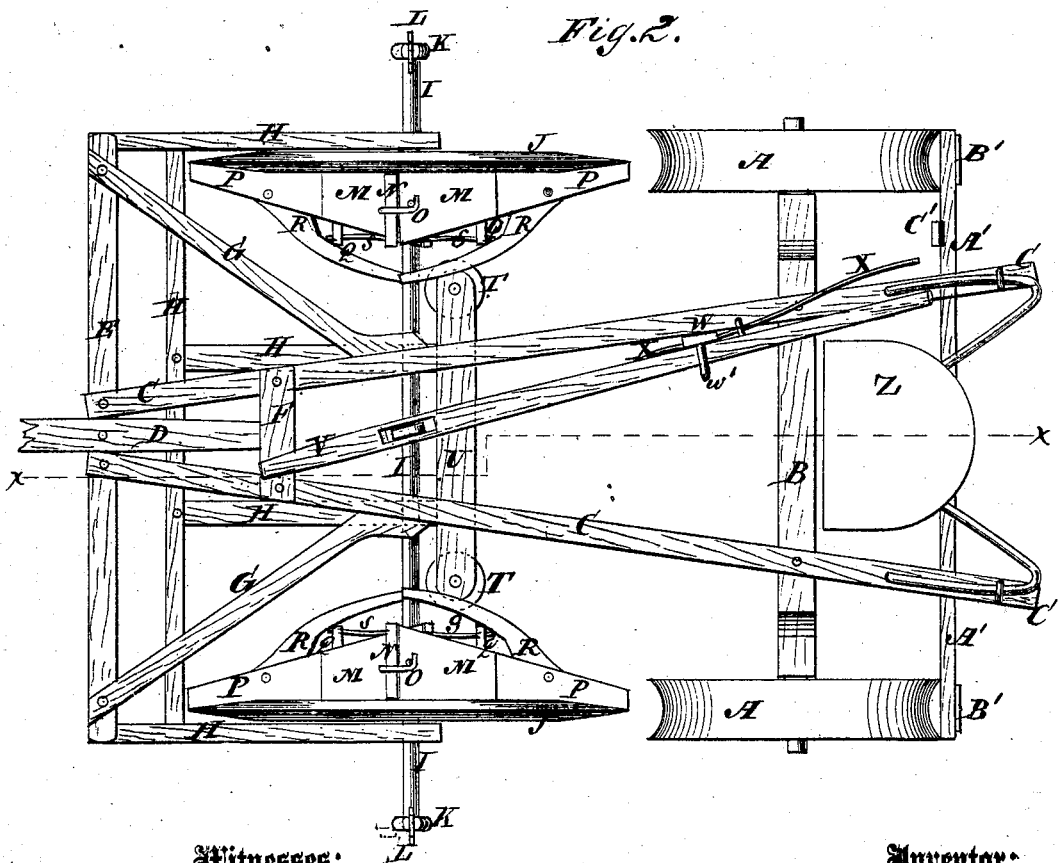

Figure 1 is a detail vertical longitudinal section of my improved machine taken through the line $x\ x$, Fig. 2. Fig. 2 is a top view of the same.

My invention has for its object to furnish an improved machine which shall be simple in construction, effective, reliable, and convenient in operation, dropping the seed automatically as the machine is drawn forward. My invention consists in the improvement of seed-planters, as hereinafter fully described and subsequently pointed out in the claim.

A are the rear wheels, the rims of which are made wide and are concaved to adapt them for pressing in the sides of the channel in which the seed has been deposited to cover said seed. The wheels A revolve upon the journals of the axle B, the middle part of which is bent upward to form an offset to receive the longitudinal bars C, the forward parts of which are inclined toward each other, space being left between their forward ends to receive the rear end of the tongue D, which is securely bolted to the cross-bar E, attached to the forward ends of the bars C, and to the short cross-bar F, attached to the said bars C a little in the rear of their forward ends. The cross-bar E is strengthened by the brace-bars G, the forward ends of which are attached to the ends of the said cross-bar E, and their rear ends are attached to the sides of the bars C. To the ends of the cross-bar E are pivoted the forward ends of the side or longitudinal bars of the frame H, which are thus hinged to the said cross-bar E. In bearings formed in or attached to the rear ends of the longitudinal bars of the frame H revolves the axle I, to which are securely and rigidly attached the wheels J, the rims of which are made sharp and V-shaped to open a channel in the ground to receive the seed. The ends of the axle I project, and to them are attached cross-bars K, having plates or paddles L attached to their ends, which, as the machine is drawn forward, strike and mark the ground, which marks serve as a guide to the driver when crossing the field the next time. The bars K L may be so arranged as to mark the ground in line with the hills, or midway between them, as may be desired. To the inner side of the wheels J are attached one or more seed-receptacles, M, provided with a close cover, N, secured by a hook or other convenient fastening, O. The receptacles M are also provided with a conductor-spout, P, extending to the rim of the wheel J to conduct the seed into the channel opened by the sharp rim of the said wheel. Q is the dropping-slide, which is forced inward to drop the seed by the lever R, and which, when relieved from the lever R, is forced and held out by the spring S. The lever R is pivoted to and between the sides of the spout P, and its lower end extends down to the outer end of said spout to serve as a guard to prevent the said spouts from becoming clogged by the soil. As the upper part of the lever R is forced outward or toward the wheels J to operate the slide Q and drop the seed the lower end of said lever R is raised to allow the seed to escape to the ground. The upper ends of the levers R are forced outward, to operate the slides Q, by striking against the friction-wheels T, pivoted to the ends of the cross-bar U, which is attached to the rearwardly-projecting ends of the middle longitudinal bars in the frame H. To the short cross-bar F is pivoted the forward end of the long lever V, to which, near its forward end, is pivoted the upper end of a standard, Y, by a pin passing through said lever, and through a hole or slot in said standard Y. The lower end of the standard Y rides upon the axle I, with which it is connected by a clip or other suitable means. The lever V passes back through a keeper, $m'$, attached to the vertical rack-bar W, and has a spring-lever catch, X, attached to it, which takes hold of the teeth of the said rack W, and thus holds the said lever V in any position into which it may be adjusted. By this construction, by operating the lever V the depth at which the seeds are deposited in the ground may be regulated at will, or the dropping device may be entirely raised from the ground for convenience in turning and passing from place to place. Z is the driver's seat, the supports of which are attached to the rear ends of the bars C, which project in the rear of the axle B, so that the driver's weight may balance the weight of the forward part of the machine. A' is a cross-bar, which is pivoted to the rear parts of the bars C, and to which are attached scraper-plates B', so formed as to fit into the concavity of the rims of the wheels A to scrape off any soil that may adhere to them. To the cross-bars A' is attached a handle, C', so that the driver may conveniently swing it forward when desired to clean the wheels A.

Having thus described my invention, I claim as new and desire to secure by Letters Patent—

The frame H, provided with bar U, having a friction-roll on each end, (by which the levers are actuated,) and pivoted to the axle, as and for the purpose specified.

Witnesses:     JEREMIAH MATTHEWS.
    LARKIN NALL,
    WALLACE NALL.            (133)